United States Patent
Rogers

(10) Patent No.: US 9,984,131 B2
(45) Date of Patent: May 29, 2018

(54) COMPARISON OF ANONYMIZED DATA

(71) Applicant: International Business Machines Corporation, Armonk, NY (US)

(72) Inventor: Antony J. Rogers, Dublin (IE)

(73) Assignee: International Business Machines Corporation, Armonk, NY (US)

(*) Notice: Subject to any disclaimer, the term of this patent is extended or adjusted under 35 U.S.C. 154(b) by 293 days.

(21) Appl. No.: 14/857,039

(22) Filed: Sep. 17, 2015

(65) Prior Publication Data

US 2017/0083521 A1    Mar. 23, 2017

(51) Int. Cl.
G06F 17/30 (2006.01)
G06F 7/00 (2006.01)
G06F 21/62 (2013.01)

(52) U.S. Cl.
CPC .... G06F 17/3053 (2013.01); G06F 17/30663 (2013.01); G06F 17/30675 (2013.01); G06F 17/30985 (2013.01); G06F 21/6254 (2013.01)

(58) Field of Classification Search
CPC ............. G06F 17/3053; G06F 21/6254; G06F 17/30985; G06F 17/30675; G06F 17/30663
USPC ....................................................... 707/729
See application file for complete search history.

(56) References Cited

U.S. PATENT DOCUMENTS

| | | | |
|---|---|---|---|
| 8,190,626 B2 | 5/2012 | Ball et al. | |
| 8,204,213 B2 | 6/2012 | Hunt et al. | |
| 8,812,300 B2 | 8/2014 | Gillam et al. | |
| 9,026,514 B2 | 5/2015 | Allen et al. | |
| 9,396,540 B1* | 7/2016 | Sampson | G06F 17/30244 |
| 2007/0239705 A1 | 10/2007 | Hunt et al. | |
| 2008/0104062 A1 | 5/2008 | Oliver et al. | |
| 2008/0292186 A1 | 11/2008 | Hamamura | |
| 2009/0043584 A1 | 2/2009 | Philips | |
| 2009/0276416 A1* | 11/2009 | Ball | G06F 17/30495 |
| 2011/0055192 A1* | 3/2011 | Tang | G06F 17/30684 707/706 |
| 2014/0156261 A1 | 6/2014 | Patman Maguire | |
| 2014/0280343 A1 | 9/2014 | Georges et al. | |

(Continued)

OTHER PUBLICATIONS

Christen, "A Comparison of Personal Name Matching: Techniques and Practical Issues", Sixth IEEE International Conference on Data Mining—Workshops (ICDMW'06), Dec. 2006, pp. 290-294.

(Continued)

*Primary Examiner* — Kuen S Lu
(74) *Attorney, Agent, or Firm* — Edward J. Wixted, III

(57) ABSTRACT

In an approach for comparing items of anonymized data, a processor receives a plurality of items of data, each item comprising an anonymized ordered list of words, wherein each word is anonymized in one or more forms and is associated with a respective item of data. A processor compares a first set and a second set of the plurality of items of data by: comparing each of the one or more forms of each word in the first set with the corresponding form of each corresponding word in the second set, scoring each comparison of each word based on a degree of matching between each of the one or more forms of each word in the first set with the corresponding form of each corresponding word in the second set, and computing a total score for the comparison of the first item and the second item based on the scoring.

11 Claims, 7 Drawing Sheets

(56) References Cited

U.S. PATENT DOCUMENTS

2015/0127565 A1* 5/2015 Chevalier .............. G06Q 10/00
  705/319
2015/0294377 A1* 10/2015 Chow ................ G06Q 30/0263
  705/347

OTHER PUBLICATIONS

Appendix P: List of IBM Patents or Patent Applications Treated as Related, Dated Oct. 19, 2016 pp. 1-2.
U.S. Appl. No. 15/297,502, filed Oct. 19, 2016; Entitled "Improved Comparison of Anonymized Data".

* cited by examiner

COMPARISON OF ANONYMIZED DATA

BACKGROUND

The present invention relates to the comparison of anonymized data, and more specifically to the anonymization of items of data in a form suitable for comparison and to the scoring of the similarity between items of anonymized data, such as names.

Data, particularly data concerning individuals, needs to be anonymized before release in many circumstances. Anonymization may be a requirement of law, or it may be a condition or policy of the organization which holds the data.

SUMMARY

Aspects of an embodiment of the present invention disclose an approach for comparing items of anonymized data. A processor receives a plurality of items of data, each item of the plurality of items of data comprising an anonymized ordered list of words, wherein each word of the anonymized ordered list of words is anonymized in one or more forms and is associated with a respective item of data. A processor compares a first set of the plurality of items of data with a second set of the plurality of items of data by: comparing each of the one or more forms of each word in the first set with the corresponding form of each corresponding word in the second set, scoring each comparison of each word in the first set with each respective word in the second set based on a degree of matching between each of the one or more forms of each word in the first set with the corresponding form of each corresponding word in the second set, and computing a total score for the comparison of the first item and the second item based on the scoring.

DETAILED DESCRIPTION

When data is anonymized, names are either omitted or anonymized, because they are the most obvious form of identifying individuals. Embodiments of the present invention recognize that, unfortunately, this makes it difficult to combine data from multiple sources, because the name is commonly used to tie the data from each of the multiple sources together, but the name may not be exactly the same in each data source. A person may be identified in one database as John Charles Smith, in another database as John Smith, and in yet another database as Jon C Smith. After anonymization, these three versions can appear to be completely different names, when they may actually be the same person appearing in the databases using variations of the same name.

Embodiments of the present invention recognize that when it is desired to use data from multiple sources in entity analytics, there may be an obligation to accept the data in anonymized form, or it may be desired to receive it in anonymized form so as to reduce the liability associated with receipt of the data.

Embodiments of the present invention recognize that it would be desirable to provide a way to score the similarity of names, even though the names are anonymized, to be able to construct entities from anonymized data.

Figure 1:
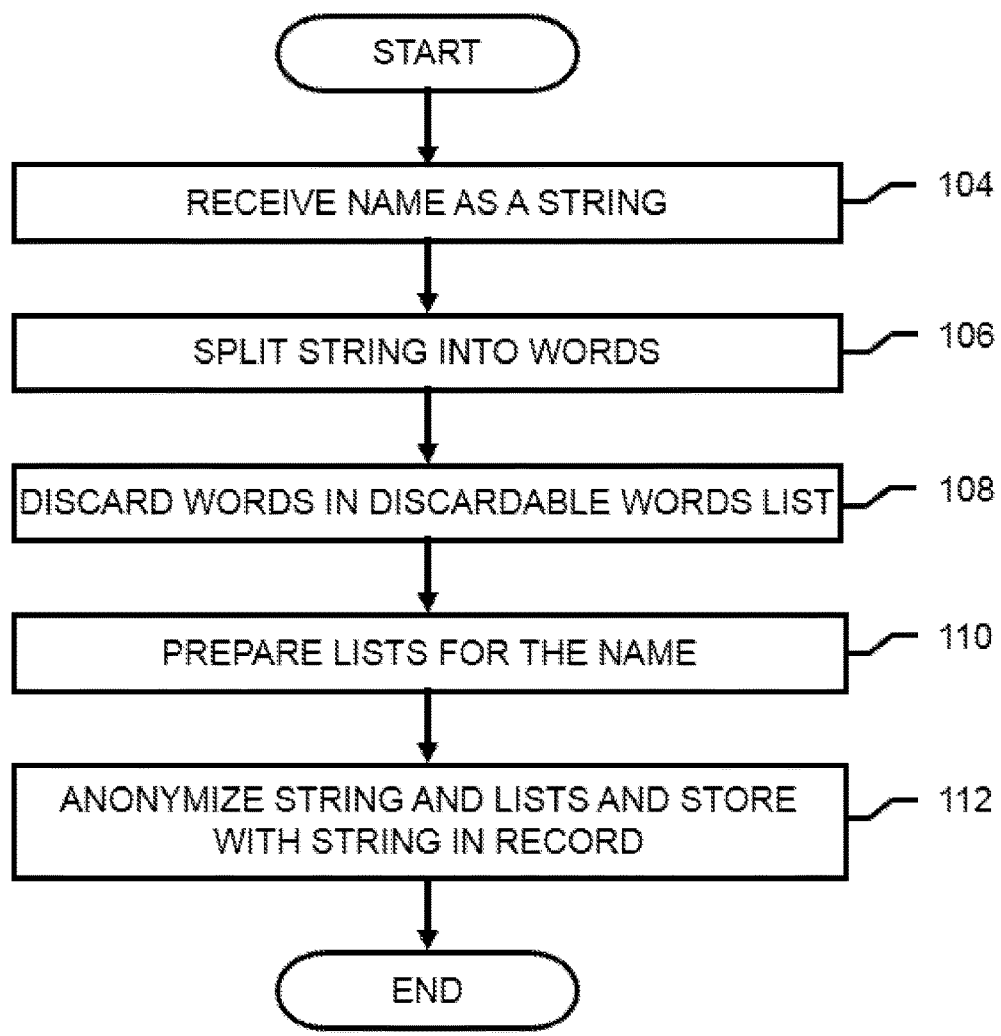
FIG. 1 shows a flowchart of a method of anonymizing items of data according to an embodiment of the present invention.

FIG. 1 shows a flowchart of an embodiment of a method of anonymizing items of data according to the present invention. This embodiment will be described using names as the items of data. However, other embodiments of the invention may use other types of items of data, such as addresses, preferences or some other types of items of data. For each of the plurality of items of data, such as names, each item of data is divided into an ordered list of words. Each of the ordered list of words are anonymized into one or more of a plurality of forms and the one or more anonymized ordered list of words are associated with the ordered list of words.

Multiple items of data may be processed in this way. In an embodiment, the processing of multiple items of data may be as a large batch of records. In another embodiment, the processing of multiple items may be as multiple single items of data. In embodiments of the invention items of data may be processed at multiple locations. The anonymized data from the multiple locations can then be sent to one or more locations to perform one or more comparisons without the location doing the comparison knowing what the items of data actually are. The location doing the comparison just sees the anonymized data. The location doing the comparison may use some of the same anonymized items of data as part of multiple comparisons. In an embodiment, the multiple locations may be part of different organizations. The different organizations do not see unanonymized data from other organizations. One of the organizations can determine if it has data matching that of another organization without breaching their data protection obligations. Only the anonymized data is shared.

At step 104, a name is received as a string. At step 106, the received string is split into an ordered list of words by splitting the received string at spaces and punctuation. In other embodiments, the received string nay be split at spaces only, at punctuation only or at predetermined characters only, such as in comma separated variable (CSV) input.

At step 108, in an embodiment, optionally, words which appear in a list of discardable words (such as, for example, Mr., Mrs., Esquire) are discarded from the ordered list and play no further part in the comparison. Typically, such words appear in a discardable list if they will not usefully contribute to a scoring of a comparison between names. In an embodiment where the items of data are addresses, the list of discardable words may include words such as "The".

At step 110, a plurality of lists are prepared for each name. A first list is a list of the words in the name, anonymized as they stand, hereinafter referred to as an "as-is" list. Others of the plurality of lists may contain, for example, variations of the words, such as the standard value for words found in a dictionary of standard values (for example, Rob, Bob, Bobby, all have a standard value of Robert), hereinafter referred to as a "standardized" list. Yet others of the plurality of lists may contain, for example, metaphone encoding of the word (e.g., Smith and Smythe both metaphone encode to SM0), hereinafter referred to as a "metaphone-encoded" list. Other lists, such as Soundex, Phonex, Phonix, NYSIIS, Double-Metaphone or Fuzzy Soundex encoding are possible. Each of the plurality of lists is associated with a similarity weight, such as, for example, 100 for an as-is match, 94 for a standardized match and 90 for a metaphone-encoded match. Other types of list may be associated with other similarity weights and other similarity weights may be used for as-is, standardized and metaphone-encoded lists.

At step 112, all of the plurality of lists are anonymized, word by word, and stored in a record (e.g., 220 in FIG. 2) associated with the received string. The result of step 112 is an anonymized string together with a plurality of associated ordered lists of anonymized words. The original string (e.g., 202 in FIG. 2) is not stored in the record. After step 112, processing ends.

Figure 2:
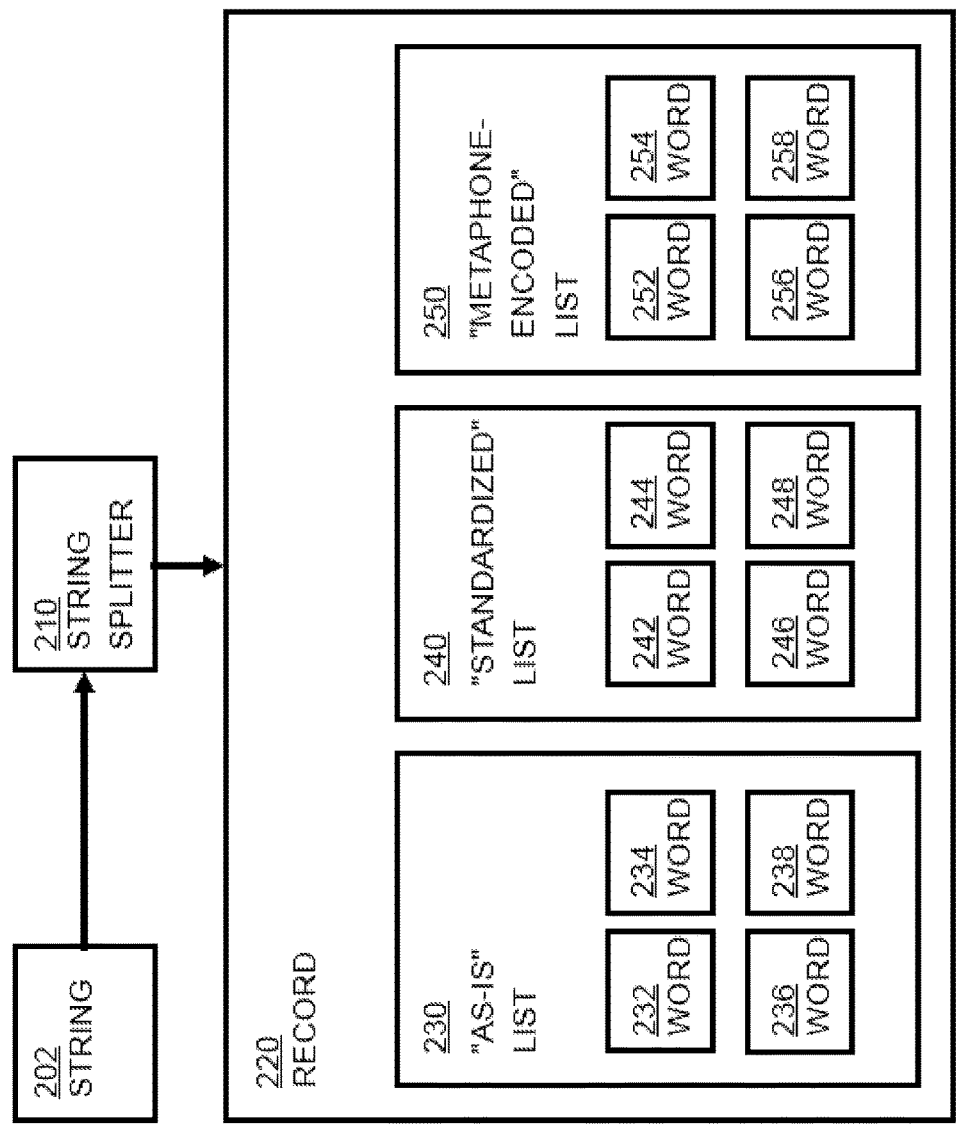
FIG. 2 shows a block diagram of a string, a string splitter and the anonymized record resulting from processing of the string by the string splitter, in accordance with one embodiment of the present invention.

FIG. 2 shows an exemplary block diagram of a string, a string splitter and the record resulting from processing of the string by the string splitter. String 202 is the string referred to with reference to FIG. 1 at step 104 above and contains a name. String 202 is received by string splitter 210. String splitter 210 splits the received string 202 into an ordered list 230 of words 232-238 by splitting the received string at spaces and punctuation as described above with reference to step 106 of FIG. 1. The ordered list 230 of words 232-238 is stored in record 220. In embodiments of the invention, the ordered list 230 of words 232-238 comprises the words stored "as-is." In embodiments, ordered list 240 comprises words 242-248 which have been "standardized." Further, in embodiments, ordered list 250 comprises words 252-258 which have been "metaphone-encoded." As described above with reference to step 112 of FIG. 1, the string 202 and each of the words 232-238, 242-248, 252-258 in the ordered lists 230, 240, 250 of words 232-238, 242-248, 252-258 are anonymized using, for example, a cryptographic hash.

Examples of received strings may include: "John Smith," "John Charles Smith," "John Ringo Paul," "Paul John Ringo," "Jon Smith," "John Smythe," "Robert John Smith," "Bob Paul Malcolm Smith," "Bill Smith," "John Malcolm Smith," "Bob Patrick Malcolm," "John Malcolm Peter Smith-Williams," "Bob Patrick Michael George Malcolm," and "Bill Jones." Each of these received strings are split into individual words using spaces and punctuation, such as, for example, the hyphen in "Smith-Williams." Ordered lists of words are then created for each of the received strings with the "as-is" ordered list simply being the words created by the splitting.

As an example, an "as-is" ordered list for "John Smith" would contain the words "John" and "Smith" and an "as-is" ordered list for "Jon Smythe" would contain the words "Jon" and "Smythe." Similarly, a "standardized" ordered list for "John Smith" would contain the "standard" value for each of the words "John" and "Smith" and a "standardized" ordered list for "Jon Smythe" would contain the "standard" value for the words "Jon" and "Smythe." Further, a "metaphone-encoded" ordered list for "John Smith" would contain the "metaphone-encoded" value for each of the words "John" and "Smith" and a "metaphone-encoded" ordered list for "Jon Smythe" would contain the "metaphone-encoded" value for the words "Jon" and "Smythe." In the examples above "John" and "Jon" have the same "standard" value in the "standardized" list as do "Bob" and "Robert." Also, in the examples above, "Smith" and "Smythe" have the same "metaphone-encoded" value in the "metaphone-encoded" list, that is "SM0."

Figure 3:
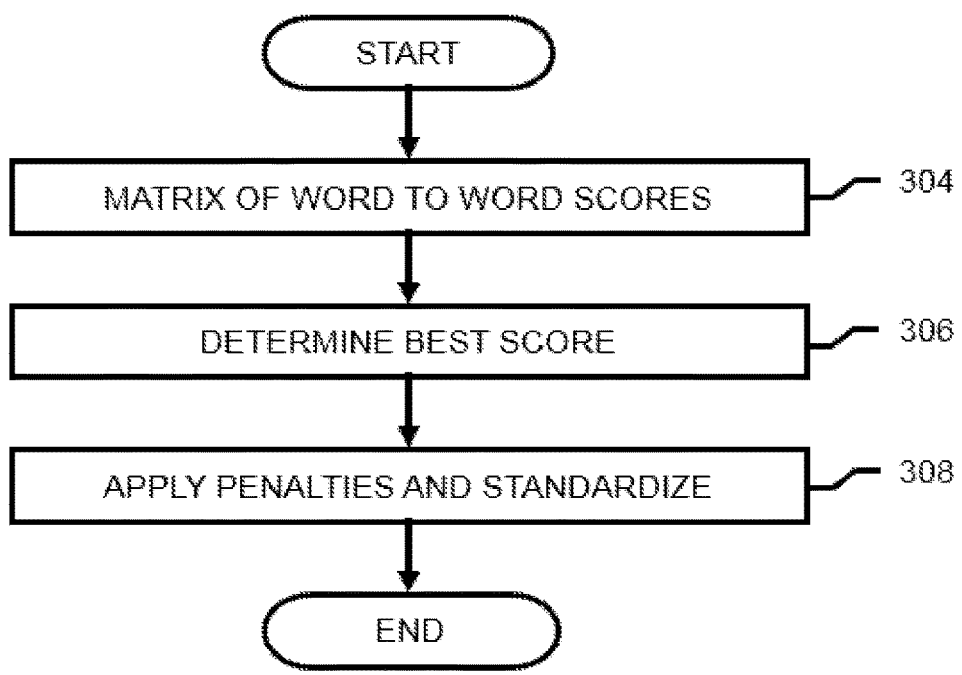
FIG. 3 shows a flowchart of a method of comparing anonymized data according to an embodiment of the present invention.

FIG. 3 shows a high level flowchart of an embodiment of a method of comparing anonymized items of data according to and embodiment of the present invention. This embodiment will be described using names as the items of data. Embodiments of the present invention are particularly advantageous when used with names because what is intended to be the same name often appears in several items of data with slight variations. Further, portions of names are particularly susceptible to appearing in items of data out of their correct order. Yet further, names are particularly susceptible to appearing in items of data in a shorter form and in a longer form. Missing matches in a shorter form of the name is more indicative that a different name is intended, whilst missing matches in a longer form of the name is more indicative that the same name is intended. However, other embodiments of the invention may use other types of items of data, such as addresses, preferences or some other types of items of data.

In this embodiment of comparing anonymized items of data, the anonymized items of data may be received from any number of different sources, with each source anonymizing the data in the same way, but with each comparer of the items of data not being aware of what the data was before it was anonymized. For example, data at a first source is "John Smith" and data at a second source is "Jon Smythe." As the anonymized data in a metaphone-encoded ordered list for each of these items of data is SM0, then an entity performing the comparison of the two anonymized items of data, will not be aware of whether either one was "John Smith" or whether either one was "Jon Smythe," it will just be aware that they match. The entity performing the comparison will not even know whether a name was, for example, "John Smith" or "Robert Jones," rather, the entity performing the comparison will just know that two names match.

The processing of comparison to find matches is quick because the comparison is done between pre-prepared ordered lists, such as the "as-is," "standardized," and "metaphone-encoded" lists referred to above.

A plurality of items of data, such as names, in anonymized form are provided. At step 304, a matrix of scores is created by comparing each word in each of the plurality of lists for a first name to be compared with each word in each of the respective plurality of lists for a second name to be compared. Scores are assigned for each comparison between each of the words in respective ones of the plurality of lists. This step is described in more detail below with reference to FIG. 4. At step 306, the best scores among the comparisons for each of the words in each of the respective plurality of lists are determined. This step is described in more detail below with reference to FIG. 5. At step 308, penalties are applied for unmatched words and the scores standardized by dividing by the number of best matching scores between words. This step is described in more detail below with reference to FIG. 6.

Figure 4:
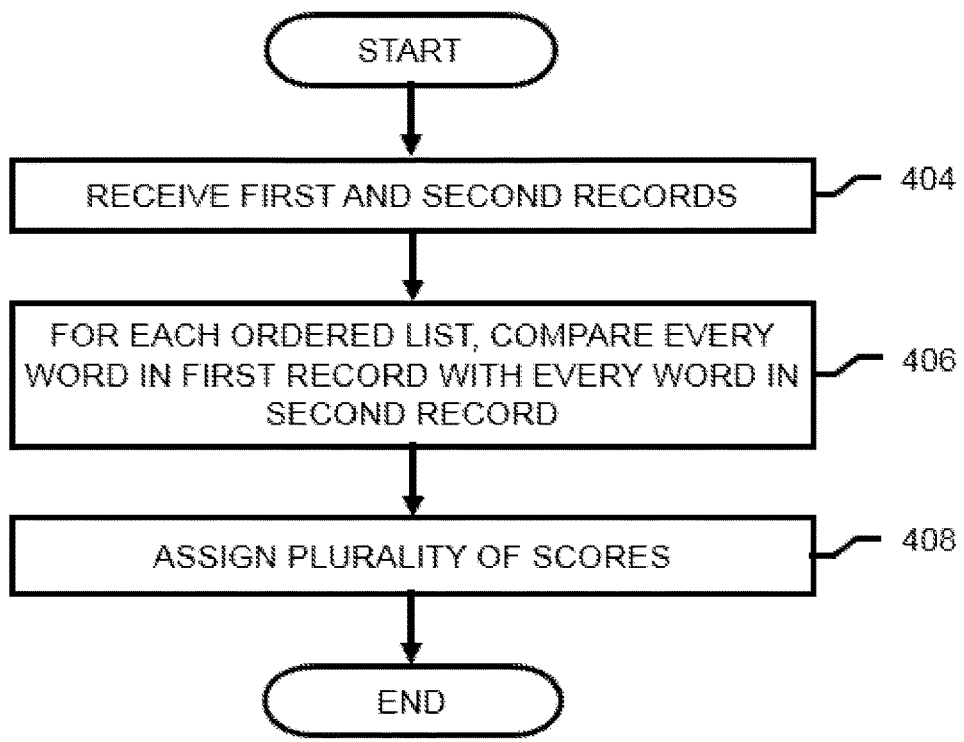
FIG. 4 shows a flowchart of the step of generating a matrix of a word to word scores of FIG. 3, in accordance with one embodiment of the present invention.
Figure 5:
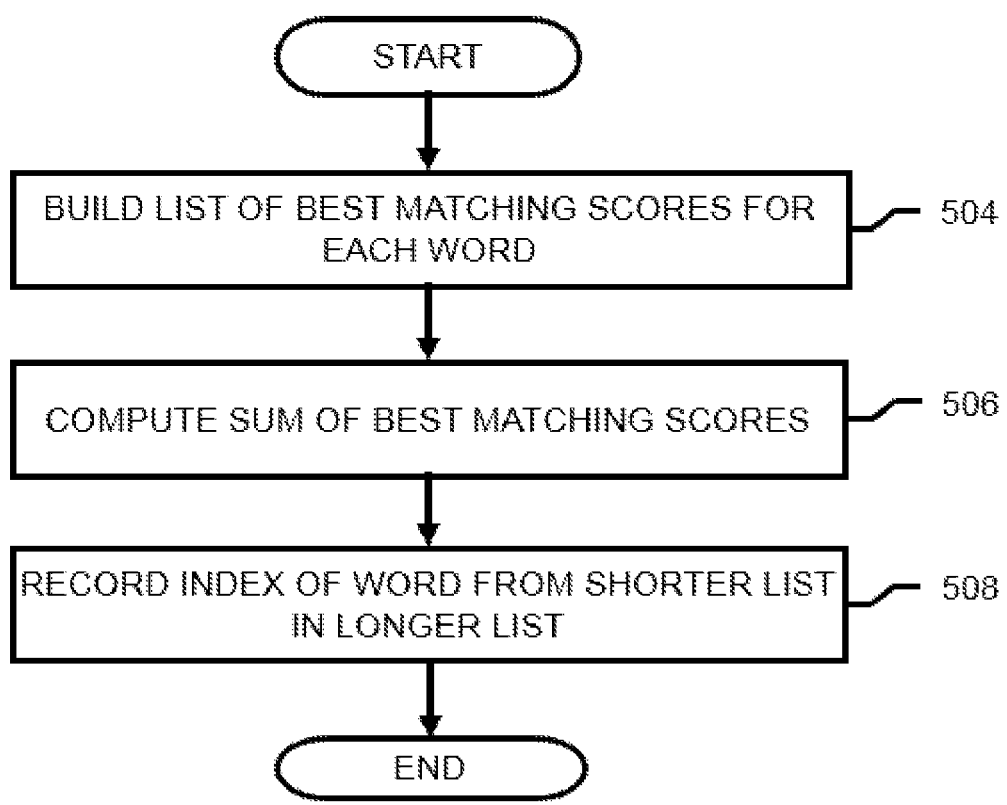
FIG. 5 shows a flowchart of the step of determining a best score of FIG. 3, in accordance with one embodiment of the present invention.
Figure 6:
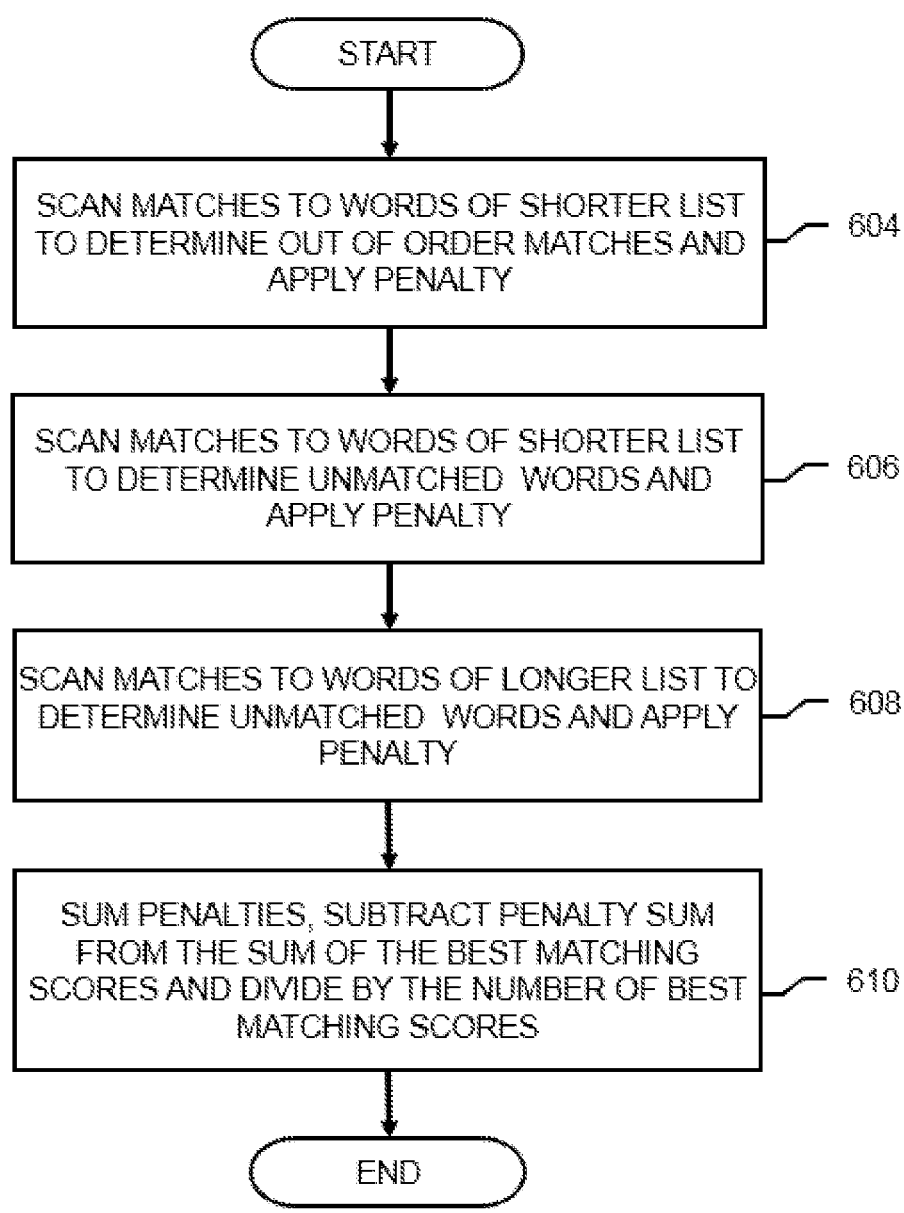
FIG. 6 shows a flowchart of the step of applying penalties and standardizing of FIG. 3, in accordance with one embodiment of the present invention.

In the description of FIGS. 4-6 below, the actual comparisons are made between the plain text names, although in practice it is the anonymized forms of the names that will be compared. For the sake of clarity, the unanonymized names are used to describe embodiments of the invention.

As examples of how the anonymization of step 112 would cause the description of FIGS. 4-6 below to differ if they were described using the anonymized names in place of the plain text names, the following names are shown in their plain text form, followed by the names represented by a SHA-2 256 cryptographic hash of the name. The cryptographic hash is not being used for the purpose of cryptography. Rather, the cryptographic has is being used as a convenient, reliable one-way mapping of variable size data into fixed size tokens. Embodiments of the present invention do not depend on the use of cryptography. Any form of anonymization which produces repeatable results, that is, a given word is always anonymized into the same token, can be used.

Smith—9f542590100424c92a6ae40860f7017ac5dfbcff3c-b49b36eace29b068e0d8e1
Smythe—4e3a72777bb0e831e5b9611173f4c05e0a923-a81b72046930dcab316c1756c67
SM0—588dcf8d6b7d8ec257c39eeb618eb253f9ade6c3f25-ffc052dae494e73fe1a43
John—a8cfcd74832004951b4408cdb0a5dbcd8c7e52d43f7-fe244bf720582e05241da
Jon—5f39b51ae9a4dacbb8d9538229d726bfb7e1a03633e3-7d64598c32989a8c1277
JN—f19bcdb3f13a992de5ca9a26c43ab3cb7fbba10bcad8-76c09184b28a4c832d57

Using the example cryptographic hashes above, the hashes for each of Smith and Smythe, as well as John and Jon would be stored in the "as-is" list. As can be seen, the "as-is" hashes of each of the words are entirely different. Both "Smith" and "Smythe" may be metaphone encoded as the same "SM0." As can be seen, the hash for "Smith" metaphone encoded as "SM0" is the same as the hash for "Smythe" metaphone encoded as "SM0." Similarly for the hashes of "John" and "Jon," both of which metaphone encode to the same "JN."

In a variation of the SHA2-256 cryptographic hash mentioned above and in order to circumvent any attack on the anonymization by exhaustive search, that is hashing all possible inputs, a secret is included in the anonymization process. The secret is shared by the anonymization sites; the comparer site does not have the secret. In an implementation the secret is 128 random bytes (1024 random bits), obtained using a cryptographically sound random source.

In a first implementation, the data to be anonymized is input to a SHA2 256 hash, followed by the shared secret. The anonymous token is the resulting SHA2-256 hash, represented as a Base64-encoded string. The shared secret is appended to the input data to avoid the known "length extension attack."

In a second implementation, the data and secret are input to an HMAC (Hash-based Message Authentication Code) algorithm, using SHA2-256 as the hashing algorithm. This method is slightly slower than the first, but there are no known attacks of the security of this algorithm.

For each of the two implementations described above, multiple iterations of anonymization may be applied to the data, including either or both of the implementations above, and a different shared secret in each iteration with each secret being held by different parties. The process for scoring the anonymized data described in this patent operates unchanged, no matter how many iterations have been performed, providing only that all data is subjected to the same anonymization.

Various examples of comparisons between names will be used in the description below. For the purposes of clarity, the two names being compared for each of the examples are listed in the table below.

|  | First name to compare | Second name to compare |
|---|---|---|
| First example | John Smith | John Smith |
| Second example | John Smith | Jon Smith |
| Third example | John Smith | John Smythe |
| Fourth example | John Smith | Bill Jones |
| Fifth example | John Smith | John Charles Smith |
| Sixth example | John Ringo Paul | Paul John Ringo |
| Seventh example | John Paul Ringo | Ringo Paul John |
| Eighth example | Robert John Smith | Bob Paul Malcolm Smith |
| Ninth example | John Smith | Bill Smith |
| Tenth example | John Malcolm Smith | Bob Patrick Malcolm |
| Eleventh example | John Malcolm Peter Smith-Williams | Bob Patrick Michael George Malcolm |

FIG. 4 shows a flowchart of an embodiment of the step of generating a matrix of word to word scores of FIG. 3. A first one of the plurality of items of data, such as names, is compared with a second one of the plurality of items of data. At step 404, first and second records 220 to be compared are received. As described in FIG. 2 above, each record 220 comprises the anonymized original string 202, together with ordered lists 230, 240, 250 of anonymized words 232-238, 242-248, 252-258.

Each of the plurality of forms of each word in the first one of the plurality of items of data is compared with the corresponding form of each word in each second one of the plurality of items of data. At step 406, each anonymized word 232-238, 242-248, 252-258 in each ordered list 230, 240, 250 in the first record 220-1 is compared with each anonymized word 232-238, 242-248, 252-258 in the corresponding ordered list 230, 240, 250 in the second record 220-2.

In a first example, a first record 220-1 may be associated with the name "John Smith". A second record 220-2 may be associated with the same name "John Smith". The "as-is" ordered lists 230 for each of these records contain the words "John", "Smith" and "John", "Smith" respectively. The "as-is" value for "John" and "John" are the same, and for "Smith" and "Smith" are the same and so the "as-is" lists for the first record 220-1 and the second record 220-2 contain the same entries.

In a second example, a first record 220-1 may be associated with the name "John Smith". A second record 220-2 may be associated with the name "Jon Smith". The "as-is" ordered lists 230 for each of these records 220 contain the words "John", "Smith" and "Jon", "Smith" respectively. The standardized value for "John" and "Jon" are the same, and so the "standardized" lists for the first record 220-1 and the second record 220-2 contain the same entries. Similarly, the metaphone-encoded values for "John" and "Jon" are the same ("JN") and so the "metaphone-encoded" lists for the first record 220-1 and the second record 220-2 contain the same entries.

In an embodiment, each word of the first name is compared with every word of the second name using every one of the ordered lists 230, 240, 250. For each one of the ordered lists 230, 240, 250, the number of comparisons is equal to the number of words in the first string 202 multiplied by the number of words in the second string 202. The total number of comparisons is the number of comparisons per ordered list 230, 240, 250 multiplied by the number of ordered lists 230, 240, 250. In another embodiment, when a successful comparison is made between a word in a first name and a word in a second name in a higher ranking ordered list 230, 240, 250, then the comparison is not completed in a lower ranking ordered list 230, 240, 250. A higher ranking ordered list 230, 240, 250 is one that has a higher match score than that of a lower ranking ordered list 230, 240, 250. For example, a match in the "as-is" ordered list 230 may mean that no comparison between the same words is needed in the "metaphone-encoded" ordered list 250.

Each comparison is scored according to which, if any, of the plurality of forms of each word in the first one of the plurality of items of data matches the corresponding form of each word in each second one of the plurality of items of data. A total score is computed for the comparison based on the comparison of each word in the first plurality of items of data with the corresponding word in each second one of the plurality of items of data and dividing the score by the number of matching words.

At step 408, a score to assigned to each of the comparisons between ordered lists 230, 240, 250. In the second example above, for the "as-is" ordered list 230, there is a match between the records 220 for "Smith," but no match between the records 220 for "John" and "Jon." Each word in the ordered lists 230, 240, 250 for the first record 220-1 is compared with every word in the corresponding ordered list 230, 240, 250 for the second record 220-2. For example, "Smith" in the first record 220-1 is compared with "Jon" in the second record 220-2 as well as with "Smith" in the second record 220-2. When the comparison is performed between the "standardized" ordered lists 240, because the standardized values for "John" and "Jon" are the same, a match exists between the "standardized" ordered lists 240 for "John" in the first record 220-1 and "Jon" in the second record 220-2. Similarly, when the comparison is performed between the "metaphone-encoded" lists 250, because the metaphone-encoded values for "John" and "Jon" are the same, a match exists between the "metaphone-encoded" lists for "John" in the first record 220-1 and "Jon" in the second record 220-2.

In a third example, a first record 220-1 may be associated with the name "John Smith." A second record 220-2 may be associated with the name "John Smythe." The "as-is" ordered lists 230 for each of these records 220 contain the words "John" "Smith," and "John" "Smythe," respectively. When "Smith" and "Smythe" are compared using the "as-is" ordered lists 230 they are identified as being different names. However, the "metaphone-encoded" value for "Smith" and "Smythe" are the same, and so the "metaphone-encoded" ordered lists 250 for the first record 220-1 and the second record 220-2 contain the same entry.

FIG. 5 shows a flowchart of an embodiment of the step of determining a best score of FIG. 3. At step 504, a list is built of the best matches for each word. The "best" match for each word is that match which has the highest score. In an embodiment of the invention a match between entries in the "as-is" ordered lists produces a score of 100, a match between "standardized" lists produces a score of 94 and a match between entries in the "metaphone-encoded" lists produces a score of 70. In an embodiment, no word in one of the names can be used in two separate matches. In an embodiment, the maximum number of matches is the number of words in the shorter of the two names. The building of the list of best matches stops when the highest scoring remaining match is zero or when all of the words in the shorter name have been matched. Two completely different names will result in a score of zero immediately.

In a fourth example, a first record 220-1 may be associated with the name "John Smith." A second record 220-2 may be associated with the name "Bill Jones." There are no matches between a name in any of the ordered lists 230, 240, 250. In an embodiment, a lack of any matches in any of the ordered lists 230, 240, 250 results in a score of 0.

In a fifth example, a first record 220-1 may be associated with the name "John Smith." A second record 220-2 may be associated with the name "John Charles Smith." The "as-is" ordered lists 230 for each of these records 220 contain the words "John," "Smith," and "John," "Charles," "Smith," respectively. Building a list of matches between entries in the respective "as-is" ordered list 230 provides a match between "John" in each "as-is" ordered list 230 and a match between "Smith" in each "as-is" ordered list 230. Even though "Smith" is the second word in the first record 220-1 and the third word in the second record 220-2, these provide the best match and so that score is counted. As the shorter of the two names has two words, that is the maximum number of matches and the building of the best matches list stops when the two words in the shorter name have been matched.

At step 506, the sum of the best matching scores is computed. In the event that there are matches between entries in both the "as-is" 230 and the "standardized" 240 ordered lists for a word, then only the higher of the scores is used. If there is no match between entries at all, a score of zero is recorded. In the first example above, both "John" and "Smith" match in the "as-is" ordered list 230, so each score 100, giving a total score of 200. In the second example above, "Smith" matches in the "as-is" ordered list 230, scoring 100, and "John" and "Jon" match in the "standardized" ordered list 240, scoring 94, giving a total score of 194. In the third example above, "John" matches in the "as-is" ordered list 230, scoring 100 and "Smith" and "Smythe" match in the "metaphone-encoded" ordered list 240, scoring 90, giving a total score of 190. In the fifth example above, both "John" and "Smith" match in the "as-is" ordered list 230, so each score 100, giving a total score of 200. The missing word "Charles" in the second record 220-2 is considered at a later stage and described below with reference to step 608 of FIG. 6.

At step 508, the index of where each of the words in the shorter string appears in the longer string is recorded, so that out of order matches may be later determined. In the fifth example above, the index of where "Smith", the second word in the shorter first record 220-1 appears in the longer second record 220-2, that is "3" is recorded. This is because the second word of the first record 220-1 matches with the third word of the second record 220-2. If both records 220 are the same length, then either of the lists may be treated as the shorter of the lists.

FIG. 6 shows a flowchart of an embodiment of the step of applying penalties and standardizing of FIG. 3. At step 604, matches to words of the shorter string are scanned to determine out of order matches and a penalty is applied for such out of order matches.

In a sixth example, a first record 220-1 may be associated with the name "John Ringo Paul." A second record 220-2 may be associated with the name "Paul John Ringo." The "as-is" ordered lists 230 for each of these records 220 contain the words "John," "Ringo," "Paul" and "Paul," "John," "Ringo," respectively. As all of "John," "Ringo" and "Paul" match in the "as-is" ordered list 230, each score 100, giving a total score of 300. However, the index recorded for the matches between respective "Johns", respective "Ringos" and respective "Pauls" are different and so there is an out of order match. The index for "John" is 3, the index for "Ringo" is 1 and the index for "Paul" is "2". There is one point in the indices where the index number decreases and so one penalty applied. A penalty is applied for the out of order match and deducted from the score resulting from the match. In an exemplary embodiment, the penalty applied is a score of 6. This penalty is quite small, because recording of words in a name out of order is quite common, although such recording does weigh against the names being compared being the same. In the sixth example, there is an out of order match and so a total penalty of 6 is applied, giving a score before standardization of (100+100+100−6), that is 294.

In a seventh example, a first record 220-1 may be associated with the name "John Paul Ringo." A second record 220-2 may be associated with the name "Ringo Paul John." The "as-is" ordered lists 230 for each of these records 220 contain the words "John," "Paul," "Ringo" and "Ringo," "Paul," "John," respectively. As each of "John," "Paul" and "Ringo" match in the "as-is" ordered list 230, each score 100, giving a total score of 300. However, the index number recorded for the matches between respective "Johns," respective "Pauls" and respective "Ringos" are different and so there is an out of order match. The index for "John" is 3, the index for "Paul" is 2 and the index for "Ringo" is 1. There are two points in the indices where the index number decreases and so two penalties applied. A penalty is applied for each out of order match and deducted from the score resulting from the match. In an exemplary embodiment, the penalty applied is a score of 6. This penalty is quite small, because recording of words in a name out of order is quite common, although such recording does weigh against the names being compared being the same. In the seventh example, there are two out of order matches and so a total penalty of 12 is applied, giving a score before standardization of (100+100+100−6−6), that is 288.

At step 606, matches to words of the shorter string are scanned in order to determine unmatched words and a penalty is applied for such unmatched words.

In an eighth example, a first record 220-1 may be associated with the name "Robert John Smith." A second record 220-2 may be associated with the name "Bob Paul Malcolm Smith." The "as-is" ordered lists 230 for each of these records contain the word "Smith." The "standardized" ordered lists 240 for each of these records contain the words "Robert" and "Bob," respectively. "Smith" matches in the "as-is" ordered list 230, scoring 100 and "Robert" and "Bob" match in the "standardized" ordered list 240, scoring 90, giving a total score of 190. However, there is no match in the second, longer record 220 to the word "John" in the first, shorter record 220 and so a penalty is applied.

In an embodiment, the penalty applied for each unmatched word in the shorter list is a score of 30. This penalty is quite large because words in a shorter list are more likely to be key elements of a name. When a person records their name they may use their full legal name, or they may abbreviate it. When they abbreviate it, they will retain the key elements, such as their primary given name and their surname or patronymic (depending on culture). This scoring method penalizes unmatched words in the shorter name heavily, on the basis that they are likely to be key elements.

At step 608, matches to words of the longer list are scanned in order to determine unmatched words and a penalty is applied for such unmatched words.

In the eighth example above, there is no match in the first, shorter string 220 to the word "Paul" or to the word "Malcolm" in the second, longer string 220 and so a penalty is applied. In an embodiment, the penalty applied for each unmatched word in the longer name is a score of 2. This penalty is quite small because words in a longer name are less likely to be key elements of a name.

At step 610, the penalty scores are summed and are subtracted from the sum of the best matching scores. The result is then divided by the number of best matching scores in order to standardize the result. This standardizes the score, and dilutes the effect of the penalties. The rationale behind diluting the effect of penalties is that a penalty matters less in the presence of more matches and more in the presence of fewer matches. If the final result is not positive, in an embodiment, it is set to 1. This is better than the zero score for no matches because there must have been at least one match to get to that result.

In the first example above ("John Smith" vs. "John Smith"), there are no penalties and two best matching scores of 100 each. The total score of 200 is divided by two matches to produce a final score of 100.

In the second example above ("John Smith" vs. "Jon Smith"), there are no penalties and two best matching scores of 100 and 94. The total score of 194 is divided by two matches to produce a final score of 97.

In the third example above ("John Smith" vs. "John Smythe"), there are no penalties and two best matching scores of 100 and 90. The total score of 190 is divided by two matches to produce a final score of 95.

In the fourth example above, ("John Smith" vs. "Bill Jones"), there are no matches and no penalties. The total score is 0.

In the fifth example above ("John Smith" vs. "John Charles Smith"), there is a penalty of 2 for the unmatched name in the longer list and two best matching scores of 100 each. The total score of 198 is divided by two matches to produce a final score of 99.

In the sixth example above ("John Ringo Paul" vs. "Paul John Ringo"), there is a penalty of 6 for out of order words and three best matching scores of 100 each. The total score of 294 is divided by three matches to produce a final score of 98.

In the seventh example above ("John Paul Ringo" vs. "Ringo Paul John"), there are two penalties of 6 for out of order words and three best matching scores of 100 each. The total score of 288 is divided by three matches to produce a final score of 96.

In the eighth example above ("Robert John Smith" vs. "Bob Paul Malcolm Smith"), there is a penalty of 30 for the unmatched name ("John") in the shorter list and two penalties of 2 each for the unmatched names ("Paul" and "Malcolm") in the longer list and two best matching scores of 100 and 94. The total score of 160 is divided by two matches to produce a final score of 80.

The embodiments of the method described above allow the handling of partial matches of anonymized names and the capture of how similar two names are, despite the anonymization, and despite the two names being compared being comprised of a different numbers of words. The embodiments go beyond a simple comparison of names to consideration of the order of the words in the name and the words which are not matched. In particular, the embodiment of the method described above is for comparing names, and the weights are chosen with that subject matter in mind.

The default scores used in the embodiments described above are 100 for an "as-is" match, 94 for a match of "standardized" values, and 90 for a match of "metaphone-encoded" values. Other scores may be added if additional lists are constructed before anonymization and other scores for the lists described may be used in other embodiments of the invention.

The default penalties used in the embodiments described above are 6 for an out of order word, 30 for an unmatched word in the shorter list, and 2 for an unmatched word in the longer list. These default scores and penalties were chosen by comparing the scores resulting from a variety of test cases with the scores from comparison methods applied to the clear-text data. However, other embodiments may use other scores and penalties.

The embodiments described above ensure a score of between 0 and the highest score assigned to a word comparison. Typically, this will be an exact match score of 100 and other progressive lower scores for other types of matches. Total penalties are diluted by the number of matching words. If two words match, total penalties are halved, if three match, they are divided by three. With these scores and penalties, only an exact match, such as in the first example above, will yield a score of 100. The highest possible score for an inexact match, such as in the fifth example above, is 99. The lowest possible score for an inexact match, such as in the eleventh example below, is 1. Only a name with no match at all, such as in the fourth example above, will produce a score of zero.

Three further examples will be provided for names that are found by comparison to be not so similar.

In an ninth example, a first record 220-1 may be associated with the name "John Smith." A second record 220-2 may be associated with the name "Bill Smith." The "as-is" ordered lists 230 for each of these records 220 contain the word "Smith." "Smith" matches in the "as-is" ordered list 230, scoring 100. However, there is no match in the second record 220-2 to the word "John," resulting in a penalty of 30 and no match in the first record 220-1 to the word "Bill," resulting in a penalty of 2. The total score of 68 is divided by one match to produce a final score of 68. This is not so similar.

In a tenth example, a first record 220-1 may be associated with the name "John Malcolm Smith." A second record 220-2 may be associated with the name "Bob Patrick Malcolm." The "as-is" ordered lists 230 for each of these records 220 contain the word "Malcolm." "Malcolm" matches in the "as-is" ordered list 230, scoring 100. However, there is no match in the second record 220-2 for either of the words "John" or "Malcolm" in the first record 220-1, resulting in two penalties of 30 and no match in the first record 220-1 to the words "Bob" or "Patrick," resulting in two penalties of 2. There is also an out of order match penalty of 6 to be applied as "Malcolm" is the second word in the first record 220-1 and the third word in the second record 220-2. The total score of 30 is divided by one match to produce a final score of 30. This is unlikely to be the same person.

In a eleventh example, a first record 220-1 may be associated with the name "John Malcolm Peter Smith-Williams." A second record 220-2 may be associated with the name "Bob Patrick Michael George Malcolm." The "as-is" ordered lists 230 for each of these records 220 contain the word "Malcolm." "Malcolm" matches in the "as-is" ordered list 230, scoring 100. However, there is no match in the second record 220-2 for any of the words "John," "Peter" or "Smith" or "Williams" in the first record 220-1, resulting in four penalties of 30 and no match in the first record 220-1 to any of the words "Bob," "Patrick," "Michael" or "George" resulting in four penalties of 2. There is also an out of order match penalty of 6 to be applied as "Malcolm" is the second word in the first record 220-1 and the fifth word in the second record 220-2. The total score of −34 is divided by one match to produce a final score of −34. As this score is less than zero, then a score of 1 is assigned because of the single match between "Malcolm" in the first and the second records 220. This is extremely unlikely to be the same person.

Figure 7:
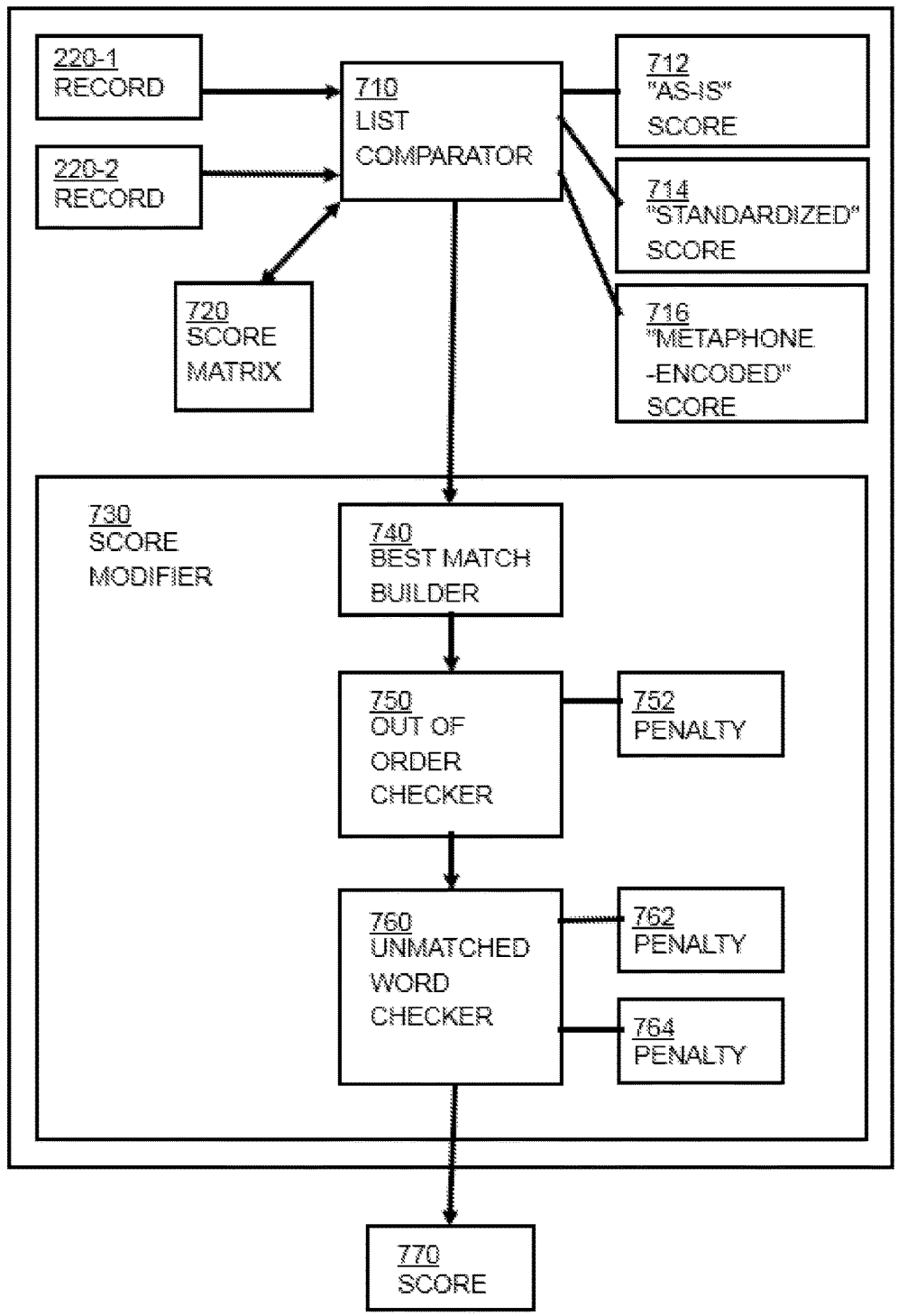
FIG. 7 shows a block diagram of a system for comparing items of anonymized data according to an embodiment of the present invention.

FIG. 7 shows a block diagram of a system for comparing anonymized items of data according to the present invention. First and second records 220 as described above with reference to FIG. 2 are received by a list comparator 710. Each of the first and second records 220 contains their own plurality of ordered lists 230, 240, 250 corresponding to the contents of the respective strings 202 associated with the respective records 220. Each of the plurality of forms of each word in the first record 220-1 is compared with the corresponding form of each word in the second record 220-2 to generate a score matrix 720. Each of the comparisons is scored according to which, if any, of said plurality of forms of each word in the first record 220-1 matches the corresponding form of each word in the second record 220-2. If there is match between words in the "as-is" list 230, then the "as-is" score 712 is applied, if there is match between words in the "standardized" list 240, then the "standardized" score 714 is applied and if there is match between words in the "metaphone-encoded" list 250, then the "metaphone-encoded" score 716 is applied. The list comparator 710 then passes the score matrix 720 to the score modifier 730.

The score modifier 730 computes a total score for the comparison based on the comparison of each word in the first record 220-1 with each word in the second record 220-2 and dividing the score by the number of matching words. Best match builder 740 identifies the best match for each word, whether "as-is," "standardized" or "metaphone-encoded" and scores it appropriately. Out of order checker 750 then checks whether any of the identified matches between words are out of order and applies an appropriate penalty 752. Unmatched word checker 760 then checks whether any of the words remains unmatched and applies an appropriate penalty 762, 764 depending on whether the unmatched word is in the shorter of the two names to be compared or the longer of the two names to be compared. Score 770 is generated by the score modifier 730.

Figure 8:
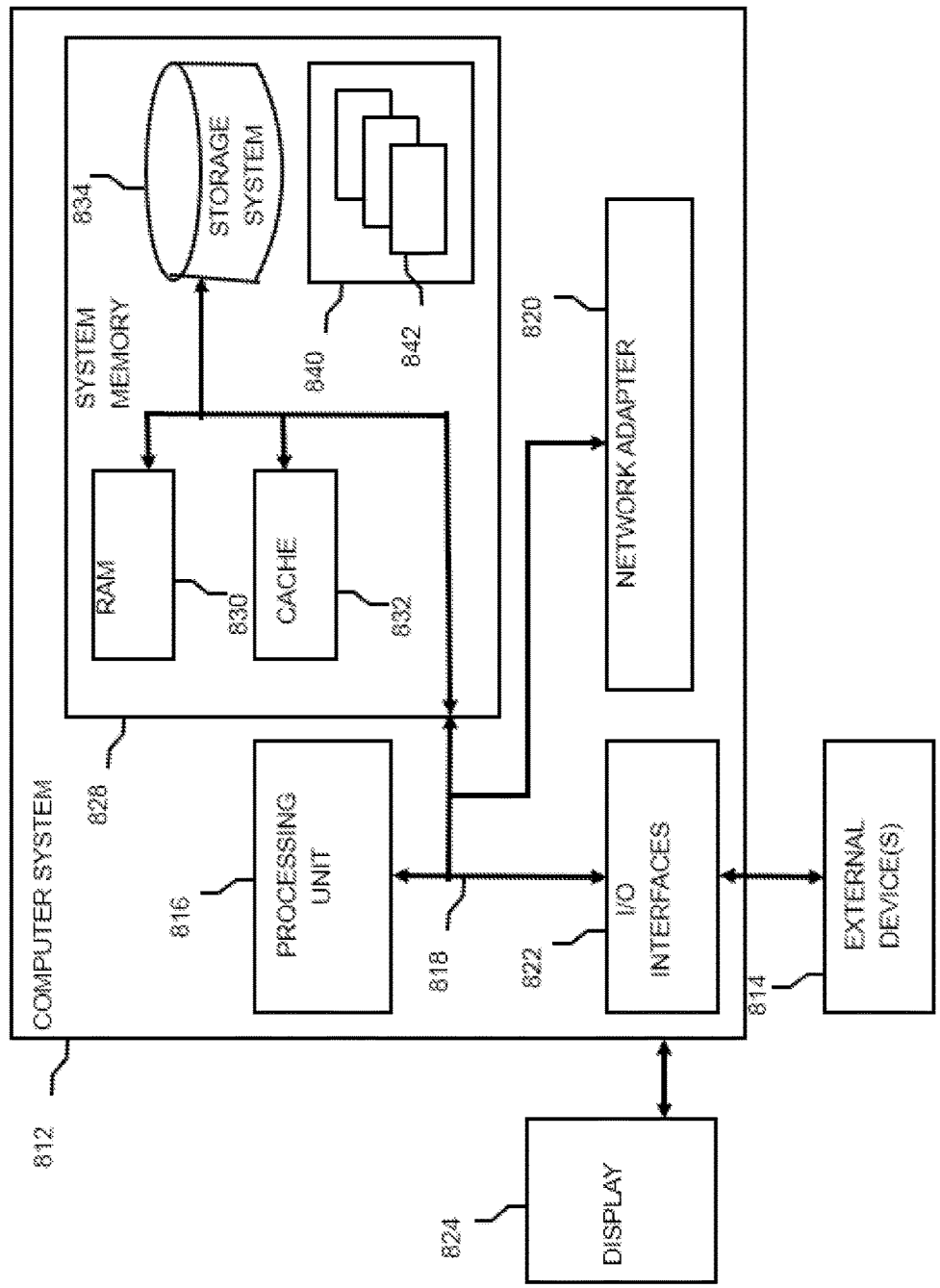
FIG. 8 shows a computer system in which the present invention may be implemented, in accordance with one embodiment of the present invention.

Referring now to FIG. 8, a schematic of an example of computing system is shown. Computing system 812 is only one example of a suitable computing system and is not intended to suggest any limitation as to the scope of use or functionality of embodiments of the invention described herein. Regardless, computing system 812 is capable of being implemented and/or performing any of the functionality set forth hereinabove.

Computer system 812 is operational with numerous other general purpose or special purpose computing system environments or configurations. Examples of well-known computing systems, environments, and/or configurations that may be suitable for use with computer system 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 812 may be described in the general context of computer system-executable instructions, such as program modules, being executed by a computer system.

Generally, program modules may include routines, programs, objects, components, logic, data structures, and so on that perform particular tasks or implement particular abstract data types. Computer system 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system 812 is shown in the form of a general-purpose computing device. The components of computer system 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 812 typically includes a variety of computer system readable media. Such media may be any available media that is accessible by computer system 812, and it includes both volatile and non-volatile media, removable and non-removable media.

System memory 828 can include computer system readable media in the form of volatile memory, such as random access memory (RAM) 830 and/or cache memory 832. Computer system 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system 812 may also communicate with one or more external devices 814 such as a keyboard, a pointing device, a display 824, etc.; one or more devices that enable a user to interact with computer system 812; and/or any devices (e.g., network card, modem, etc.) that enable computer system 812 to communicate with one or more other computing devices. Such communication can occur via Input/Output (I/O) interfaces 822. Still yet, computer system 812 can communicate with one or more networks such as a local area network (LAN), a general wide area network (WAN), and/or a public network (e.g., the Internet) via network adapter 820. As depicted, network adapter 820 communicates with the other components of computer system 812 via bus 818. It should be understood that although not shown, other hardware and/or software components could be used in conjunction with computer system 812. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for comparing items of anonymized data, the computer program product comprising:
   one or more computer readable storage media and program instructions stored on the one or more computer readable storage media, the program instructions comprising:
   program instructions to receive a plurality of items of data, each item of the plurality of items of data comprising an anonymized ordered list of words, wherein each word of the anonymized ordered list of words is anonymized in a plurality of forms and is associated with a respective item of data, wherein the plurality of forms comprise: a respective word of the anonymized ordered list of words as the respective word originally appeared, a variation of the respective word, and a metaphone encoding of the respective word; and
   program instructions to compare a first item of the plurality of items of data with a second item of the plurality of items of data by:
      comparing each of the plurality of forms of each word in the first item with the corresponding form of each corresponding word in the second item;
      scoring each comparison of each word in the first item with each respective word in the second item based on:
         a degree of matching between each of the plurality of forms of each word in the first item with the corresponding form of each corresponding word in the second item;
         a plurality of weights assigned to each corresponding form of the plurality of forms, wherein a first weight is assigned to the respective word of the anonymized ordered list of words as the respective word originally appeared, a second weight is assigned to the variation of the respective word, and a third weight is assigned to the metaphone encoding of the respective word; and
         wherein the first weight exceeds the second weight and the second weight exceeds the third weight; and
      computing a total score for the comparison of the first item and the second item based on the scoring.

2. The computer program product of claim 1, wherein program instructions to compute the total score for the comparison of the first item and the second item further comprise:
  program instructions to determine a number of matching words between the first item and the second item, based on the degree of matching; and
  program instructions to divide the total score by the number of matching words.

3. The computer program product of claim 1, wherein program instructions to compute the total score are further based on a first value associated with unmatched words, based on the degree of matching, in the longer set of the first item and the second item and a second value associated with unmatched words, based on the degree of matching, in the shorter item of the first item and second item, wherein the first value is less than the second value.

4. The computer program product of claim 1, wherein program instructions to compute the total score are further based on a value associated with matching words, based on the degree of matching, between the first item and the second item, wherein the matching words are located in different positions in each respective ordered list of words of the first item and the second item.

5. The computer program product of claim 1, wherein program instructions to compute the total score are further based on a value associated with unmatched words, based on the degree of matching, in the longer item of the first item and the second item.

6. The computer program product of claim 1, wherein program instructions to compute the total score are further based on a value associated with unmatched words, based on the degree of matching, in the shorter item of the first item and the second item.

7. A computer system for comparing items of anonymized data, the computer system comprising:
  one or more computer processors, one or more computer readable storage media, and program instructions stored on the computer readable storage media for execution by at least one of the one or more processors, the program instructions comprising:
  program instructions to receive a plurality of items of data, each item of the plurality of items of data comprising an anonymized ordered list of words, wherein each word of the anonymized ordered list of words is anonymized in a plurality of forms and is associated with a respective item of data, wherein the plurality of forms comprise: a respective word of the anonymized ordered list of words as the respective word originally appeared, a variation of the respective word, and a metaphone encoding of the respective word; and
  program instructions to compare a first item of the plurality of items of data with a second item of the plurality of items of data by:
    comparing each of the plurality of forms of each word in the first item with the corresponding form of each corresponding word in the second item;
    scoring each comparison of each word in the first item with each respective word in the second item based on:
      a degree of matching between each of the plurality of forms of each word in the first item with the corresponding form of each corresponding word in the second item;
      a plurality of weights assigned to each corresponding form of the plurality of forms, wherein a first weight is assigned to the respective word of the anonymized ordered list of words as the respective word originally appeared, a second weight is assigned to the variation of the respective word, and a third weight is assigned to the metaphone encoding of the respective word; and
      wherein the first weight exceeds the second weight and the second weight exceeds the third weight; and
    computing a total score for the comparison of the first item and the second item based on the scoring.

8. The computer system of claim 7, wherein program instructions to compute the total score for the comparison of the first item and the second item further comprise:
  program instructions to determine a number of matching words between the first item and the second item, based on the degree of matching; and
  program instructions to divide the total score by the number of matching words.

9. The computer system of claim 7, wherein program instructions to compute the total score are further based on a first value associated with unmatched words, based on the degree of matching, in the longer set of the first item and the second item and a second value associated with unmatched words, based on the degree of matching, in the shorter item of the first item and second item, wherein the first value is less than the second value.

10. The computer system of claim 7, wherein program instructions to compute the total score are further based on a value associated with matching words, based on the degree of matching, between the first item and the second item, wherein the matching words are located in different positions in each respective ordered list of words of the first item and the second item.

11. The computer system of claim 7, wherein program instructions to compute the total score are further based on a value associated with unmatched words, based on the degree of matching, in the longer item of the first item and the second item.

* * * * *